United States Patent
Partington et al.

Patent Number: 5,723,845
Date of Patent: Mar. 3, 1998

[54] AUTOMOTIVE SEAT WITH CO-WOVEN HEATING ELEMENTS

[75] Inventors: Eric A. Partington, Auburn Hills; John P. Slaven, Harper Woods, both of Mich.

[73] Assignee: Lear Corporation, Southfield, Mich.

[21] Appl. No.: 606,101

[22] Filed: Feb. 23, 1996

[51] Int. Cl.⁶ .................................. H05B 1/00; H05B 3/34
[52] U.S. Cl. .................................. 219/217; 219/545
[58] Field of Search .................................. 219/202, 211, 219/212, 217, 528, 529, 545, 549

[56] References Cited

U.S. PATENT DOCUMENTS

| | | |
|---|---|---|
| 3,472,289 | 10/1969 | Webber et al. .................. 219/545 |
| 4,538,054 | 8/1985 | Bretoniere .................. 219/545 |
| 4,626,868 | 12/1986 | Svensson . |
| 4,633,061 | 12/1986 | Arikawa . |
| 4,645,913 | 2/1987 | Oppitz . |
| 4,695,091 | 9/1987 | Altmann et al. . |
| 4,697,064 | 9/1987 | Altmann et al. . |
| 4,813,738 | 3/1989 | Ito . |
| 4,865,379 | 9/1989 | Aoki et al. . |
| 4,952,776 | 8/1990 | Huguet . |
| 4,964,674 | 10/1990 | Altmann et al. . |
| 4,983,814 | 1/1991 | Ohgushi et al. . |
| 5,002,335 | 3/1991 | Bengtsson . |
| 5,023,433 | 6/1991 | Gordon . |
| 5,111,025 | 5/1992 | Barma et al. . |
| 5,170,036 | 12/1992 | Altmann et al. . |
| 5,298,722 | 3/1994 | Tanaka .................. 219/545 |
| 5,484,983 | 1/1996 | Roell .................. 219/545 |

*Primary Examiner*—Teresa J. Walberg
*Assistant Examiner*—Sam Paik
*Attorney, Agent, or Firm*—Howard & Howard

[57] ABSTRACT

An automotive seat assembly 10 comprising a seat 12 and a seat back 14 with a fabric cover 16 comprising non-conductive polyester fibers 18 woven together and electrically conductive pure carbon elements 22 woven into the fibers 18 and extending between braided copper strands defining electrodes 20. Each of the conductive elements 22 consists of a single and homogeneous composition of pure carbon to create heat in response to electrical current and presenting a bare surface in contact with the surrounding fibers 18 to emit the heat directly from the bare surface to heat the surrounding enviroment.

11 Claims, 1 Drawing Sheet

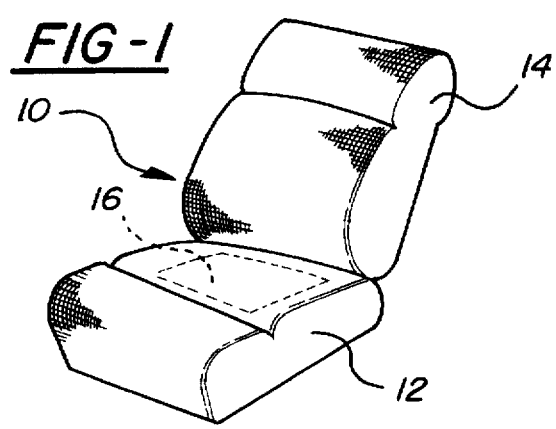
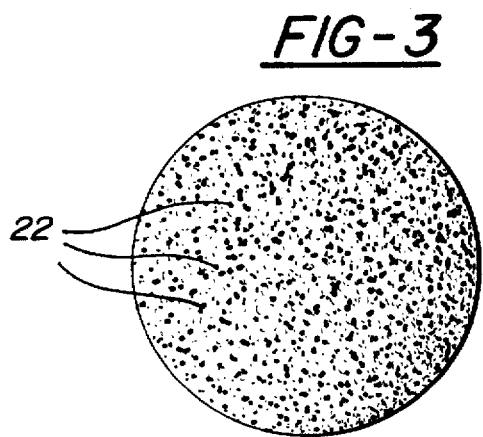
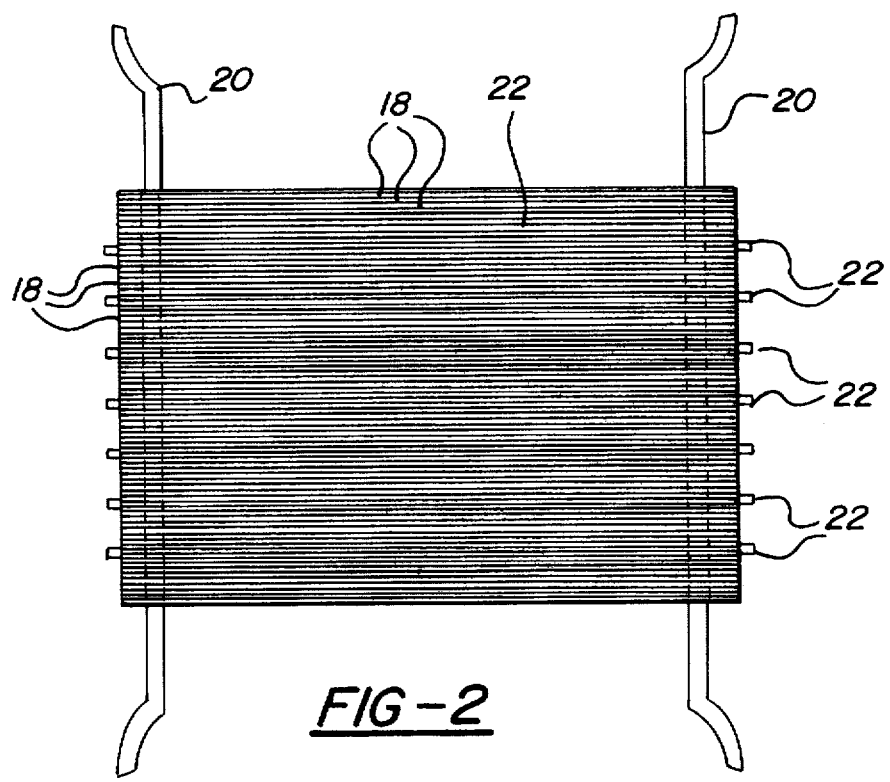
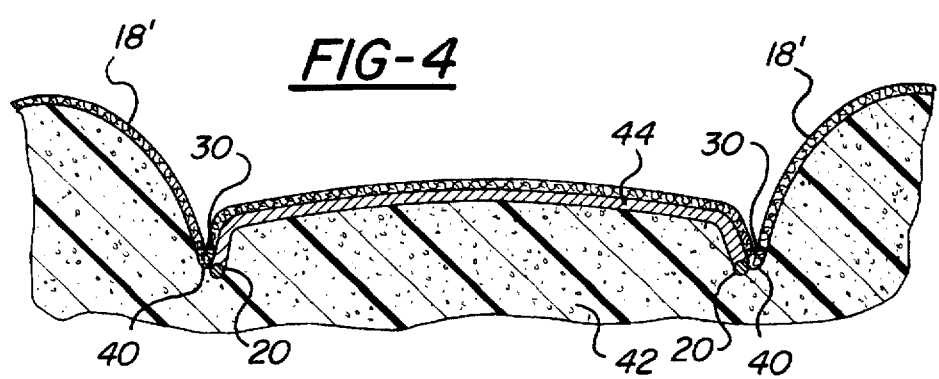

AUTOMOTIVE SEAT WITH CO-WOVEN HEATING ELEMENTS

TECHNICAL FIELD

The subject invention relates to an automotive seat having a built-in heater.

BACKGROUND OF THE INVENTION

Automotive seats with various types of built-in heaters for heating the body of the occupant are well known. One such assembly comprises a fiber coated with a conductive layer of polyurethane resin containing carbonaceous particles dispersed therein, as disclosed in U.S. Pat. No. 4,983,814 to Ohgushi et al. Yet another discloses an entire sheet embedded with carbon particles to conduct electricity and generate heat, as shown in U.S. Pat. No. 5,023,433 to Gordon. In U.S. Pat. No. 4,629,868 to Svensson, the electrical conductors are embedded between two plastic layers.

It is an object of such heaters to remain pliable enough that the seat occupant does not regard the seat as stiff.

SUMMARY OF THE INVENTION AND ADVANTAGES

An automotive seat assembly comprising a seat and a seat back with a fabric cover disposed over at least one of the seat and the seat back and including non-conductive fibers woven together, spaced electrodes and electrically conductive elements woven into the fibers and extending between the electrodes. The cover is characterized by each of the conductive elements consisting of a single and homogeneous composition acting as a resister to create heat in response to electrical current and presenting a bare surface in contact with the surrounding fibers to emit the heat directly from the surface to heat the surrounding environment.

Accordingly, the heating cloth is intended to be durable and pliable enough to be used as the primary finish cover for an automotive seat.

BRIEF DESCRIPTION OF THE DRAWINGS

Other advantages of the present invention will be readily appreciated as the same becomes better understood by reference to the following detailed description when considered in connection with the accompanying drawings wherein:

FIG. 1 is a perspective view of an automotive seat incorporating the subject invention;

FIG. 2 is a plan view of the cover incorporating the heating elements;

FIG. 3 is a cross sectional view of the electrical conducting element used in the preferred embodiment of the subject invention; and FIG. 4 is a partial cross-section view of the seat taken along lines 4—4 of FIG. 1.

DETAILED DESCRIPTION OF THE PREFERRED EMBODIMENT

Referring to the Figures, wherein like numerals reference like or corresponding parts throughout the several views, an automotive seat assembly constructed in accordance with the subject invention is generally shown at 10. The automotive seat assembly 10 comprising a seat 12 and a seat back 14.

A fabric cover 16 disposed over at one of the seat 12 and the seat back 14, either defining the primary cover for the foam cushions of the seat 10 or by being sewn, or otherwise secured, to the primary cover.

The cover 10 comprises a woven fabric fibers 18, usually synthetic fibers, and sometimes wool fibers, i.e., non-conductive fibers woven together. The cover 10 also includes spaced electrodes 20 and electrically conductive elements 22 woven into the fibers 18 and extending between the electrodes 20.

Electrodes 20 consist of flat braided copper wire. Alternatively any highly conductive material should be a satisfactory substitute. Each of the conductive elements 22 consists of a single and homogeneous composition acting as an electrical resister to create heat in response to electrical current and presenting a bare surface in contact with the surrounding fibers 18 to emit the heat directly from the bare surface to heat the surrounding environment. The conductive elements 22 consist of stranded micro-filaments of pure carbon, and specifically low resistance carbon.

Each of the conductive elements 22 is separated from the adjacent conductive element 22 by a plurality of the non-conductive synthetic fibers 18, consisting of a polyester. That is, fibers 18 are parallel to one another and disposed between adjacent conductive elements 22. Each conductive element 22 each consists of hundreds of the micro-filaments 24 of pure carbon. The conductive elements 22 are in parallel relationship to one another between the electrodes 20, both physically and as an electrical circuit. Preferably the spacing between each conductive element 22 is at a grid size or density of 10 element 22 per inch. Coincidentally this will provide a non conductive thread density of 15–50 threads per inch. This will provide the desired heat energy output as based on the following design formula which is a part of the present invention.

The design formulation includes use of the formulas 1, 2 and 3 listed below for deriving specific power (P) and current draw (I) maintaining P within a range of 0.10 to 1.0 wetts/in2 and maintaining I at a maximum of 9 amps. Utilizing an ilevative process of optimum number of threads per inch can thereby be selected based on the desired values for P and I.

$$R = \frac{(\Omega)(W)}{(T)(12)(L)} \quad (1)$$

$$P = \frac{(V^2)}{(L)(W)} \quad (2)$$

$$I = \frac{(P)(L)(W)}{V} \quad (3)$$

$T$ = ~Threads per Inch (22)~~
$\Omega$ = Specific resistance of carbon fibers (22) [ohms per foot]
$V$ = Voltage applied to electrodes (20) [volts]
$L$ = Length of electrodes connected to fabric [inches]
$W$ = Width of distance between electrodes [inches]
$R$ = Equivalent resistance of entire heating element [ohms]

The electrodes 20 consist of flat braided copper wire.

The invention has been described in an illustrative manner, and it is to be understood that the terminology which has been used is intended to be in the nature of words of description rather than of limitation.

Obviously, many modifications and variations of the present invention are possible in light of the above teachings. It is, therefore, to be understood that within the scope of the appended claims, wherein reference numerals are merely for convenience and are not to be in any way limiting, the invention may be practiced otherwise than as specifically described.

As seen in FIG. 4, the electrodes 20 are disposed within seat trenches 40 provided as molded within the seat foam substructure 42. Disposed over the polyurethane foam in the seat area to be listed is a plus pad polyurethane foam layer element 44 of different density (lower), thin foam number 42.

The cover 10 is disposed over the plus pad 44 in a manner positioning the electrode 20 in the trenches 40, and is sewn (as indicated at 30) to adjacent cover elements 18' of fabric or other conventional seating materials, thereby securing the heated fabric cover portion in place.

What is claimed is:

1. An automotive seat assembly comprising:
   a seat;
   a seat back;
   each of said seat and said seat back including a resilient contoured foam substructure and at least one of said foam substructures having spaced recessed trenches molded within said foam;
   a fabric cover disposed over said foam substructure of at least one of said seat and said seat back;
   said cover including non-conductive fibers woven together, spaced electrodes and electrically conductive elements woven into said fibers and extending between said electrodes,
   said cover including each of said conductive elements consisting of a single and homogeneous composition acting as a resister to create heat in response to electrical current and presenting a bare surface in contact with said surrounding fibers to emit said heat directly from said surface to heat the surrounding environment; and
   said electrodes positioned in said recessed trenches to secure said electrodes and said fabric cover to said foam substructure.

2. An assembly as set forth in claim 1 wherein said conductive elements consist of stranded micro-filaments.

3. An assembly as set forth in claim 2 wherein said homogeneous composition is carbon.

4. An assembly as set forth in claim 3 wherein each of said conductive elements is separated from the adjacent conductive element by a plurality of said non-conductive fibers.

5. An assembly as set forth in claim 4 wherein said electrodes comprise braided strands.

6. An assembly as set forth in claim 5 wherein said strands consist of copper.

7. An assembly as set forth in claim 6 wherein said strands consist of flat braided copper wire.

8. An assembly as set forth in claim 2 wherein each of said conductive elements consists of hundreds of said micro-filaments.

9. An assembly as set forth in claim 2 wherein six to ten fibers are parallel to one another and disposed between adjacent conductive elements.

10. An assembly as set forth in claim 2 wherein said fibers consist of a polyester.

11. An assembly as set forth in claim 2 wherein said conductive elements are in parallel between said electrodes.

* * * * *